United States Patent Office 2,988,879
Patented June 20, 1961

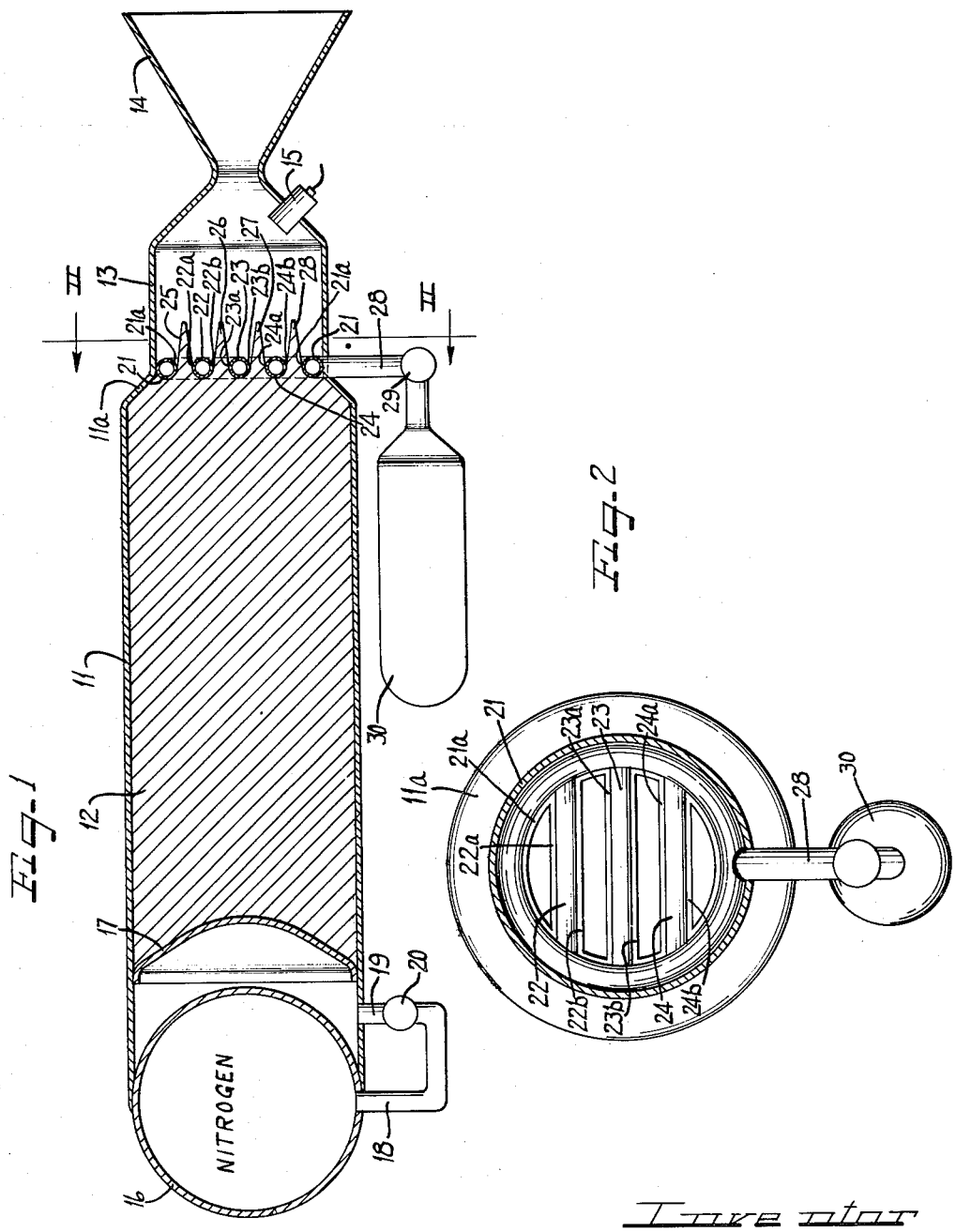
Inventor
James C. Wise

2,988,879
ROCKET WITH FLUID FLAME EXTINGUISHER FOR EXTRUDED FUEL
James C. Wise, Euclid, Ohio, assignor to Thompson Ramo Wooldridge Inc., Cleveland, Ohio, a corporation of Ohio
Filed Nov. 24, 1958, Ser. No. 775,899
6 Claims. (Cl. 60—35.6)

This invention relates to a method and apparatus for stopping a rocket motor or engine. More particularly, this invention relates to a method and apparatus for quickly and positively stopping the operation of a gelatinous mono-propellant fueled rocket engine by applying a blast of air, carbon dioxide or the like gas to cut off a plurality of wedges of the fuel being extruded into a combustion chamber to stop the burning thereof.

It is a feature of the present invention to provide a gelatinous mono-propellant fueled rocket engine wherein the fuel is extruded from one end of a fuel tank into a combustion chamber to be ignited therein so the gases of combustion may be discharged through a thrust producing nozzle. In order to afford the desired burning surface area of the fuel in the combustion chamber, a grid of hollow tubes is mounted across the inlet to the combustion chamber to divide the incoming fuel into a plurality of separate wedges or other separate fuel plugs. The surface areas of these separate wedges or plugs normally burn to provide the desired gas generation after having been ignited by any convenient igniting means. Although the type of mono-propellant fuel preferred for use herein, to be described in detail below, will extinguish itself if the extrusion rate is reduced to zero, that is to say, if the extrusion is stopped, it is the purpose of the present invention to provide a faster and more positive means of stopping the burning of the fuel. This is accomplished by providing the tubular grid members with slots in the sides thereof through which a blast of air, carbon dioxide, or the like gas under pressure is emitted to cut off the wedge of fuel which has been extruded and to prevent the extrusion of additional fuel. The pressure of the inhibiting gas is preferably greater than the pressure applied to extrude the fuel from the tank so that the extrusion is stopped simultaneously with the cutting off of the wedge of fuel which has already been extruded.

It is therefore an object of the present invention to provide a method and apparatus for quickly and positively stopping the operation of a rocket engine.

It is a further object of the present invention to provide a method and apparatus for quickly and positively stopping the operation of a gelatinous mono-propellant fueled rocket engine by applying a gas under pressure to stop the extrusion of fuel and to cut off from the main body of fuel portions of fuel which have already been extruded.

It is a further object of this invention to provide a rocket engine structure wherein an annular manifold at the outlet of a fuel tank supports a plurality of fuel divider tubes across the entrance to the combustion chamber which normally serve as fuel dividers and the side of which are provided with slots through which a gas under pressure may be applied to prevent or stop the extrusion of fuel.

Other objects, features, and advantages of the present invention will be more fully apparent to those skilled in the art from the following detailed description taken in connection with the acompanying drawings in which like reference characters refer to like parts throughout and wherein:

FIGURE 1 is a sectional view partly diagrammatic of a rocket engine structure suitable for carrying out the method of the present invention.

FIGURE 2 is a sectional view taken on the line II—II of FIGURE 1.

Turning now to the drawings, there is shown in FIGURE 1 a rocket engine comprising a fuel tank 11 adapted to contain a fuel 12 which, by way of example, may preferably be a gelatinous mono-propellant fuel. Suitable gelatin mono-propellants have recently been developed which combine many of the advantages and eliminate many of the disadvantages of both solid and liquid propellants. Such gelatin mono-propellant fuels are extrudible plastic viscous slurries or gelatinous materials. Numerous suitable mono-propellant mixtures can be made into this form. Such mixtures preferably comprise a stable dispersion of a finely divided insoluble solid oxidizer in a continuous matrix of an oxidizable liquid fuel. The liquid fuel can be any oxidizable liquid, preferably an organic liquid containing carbon and hydrogen. Such liquid fuels include hydrocarbons such as triethyl benzine, dodecane and the like; compounds containing oxygen linked to a carbon atom such as esters including methyl maleate, diethyl phthalate, butyl oxalate, and the like; alcohols such as benzyl alcohol, triethylene glycol and the like; ethers such as methyl o-naphthyl ether and the like, and many others.

The solid oxidizer can be any suitable active oxidizing agent which yields an oxidizing element such as oxygen, chlorine, or fluorine readily for combustion of the fuel and which is insoluble in the liquid fuel vehicle. Such oxidizers include inorganic oxidizing salts such as ammonia, sodium and potassium perchlorate or nitrate and metal peroxides such as barium peroxide.

Finely divided solid metal powders, such as aluminum or magnesium, may be incorporated in the mono-propellant composition as an additional fuel component along with the liquid fuel. Such metal powders possess the advantages both of increasing the fuel density and improving the specific impulse of the mono-propellant because of their high heats of combustion.

Gelling agents for imparting desired cohesiveness and flow characteristics to the plastic mixture include natural and synthetic polymers such as polyvinyl chloride, polyvinyl acetate, cellulose esters such as cellulose acetate, cellulose ethers such as ethyl cellulose, metal salts of higher fatty acids such as the sodium or magnesium stearates and palmitates.

The amount of oxidizer is preferably at a stoichiometric level with respect to the liquid fuel, although minimum concentrations of solid oxidizer as low as 40% by weight are operative. In general, the oxidizer will constitute about 65% by weight of the mixture. A preferred operative gelatinous mono-propellant includes a gel composed of up to 50% by weight of a liquid fuel, from 40% to 65% by weight of an oxidizer and from 3% to 10% of a gelling agent. A specific operative fuel can be composed of about 50% by weight of solid oxidizers such as potassium perchlorate, about 45% by weight of liquid fuels such as triethyl benzine, and about 5% by weight of a gelling agent such as ethyl cellulose. It is to be understood, however, that this invention is not limited to use of any particular fuel or in fact, necessarily to any particular gelatinous mono-propellant mixture, but rather is directed to a method and apparatus for quickly and positively stopping the operation of a rocket engine as will be described in detail below.

As noted above, the fuel 12 is contained in a fuel tank 11 which is preferably of generally cylindrical shape and is open at its rearward end wall 11a. A combustion chamber 13 is mounted in any convenient manner at the rearward end 11a of the fuel tank. A nozzle 14 may conveniently form a continuation of the combustion chamber to generate the thrust of the rocket engine by discharging gases generated in the combustion chamber 13 from fuel burned therein. Any suitable conventional igniter 15 is provided to start the operation of the engine.

The igniter 15, shown only schematically in FIGURE 1, may for example be a small igniting charge or a squib or hot wire type of electrically operated igniter.

Mounted at the forward end of the fuel tank 11 is an inert gas storage tank 16 which may either be separate from the fuel tank or may conveniently form the forward wall of the fuel tank 11. Slidably mounted within the fuel tank 11 is a piston or plunger 17 which is positioned to be actuated by inert gas such as nitrogen admitted from tank 16 through a conduit or pipeline 18 having a branch conduit 19 in which is interposed a valve 20. Branch conduit 19 enters the fuel tank 11 forwardly of the plunger 17 so that when inert gas under pressure is admitted through valve 20 by opening the valve, the plunger 17 will be forced rearwardly in the tank 11 thereby pushing or extruding the gelatinous fuel 12 from the fuel tank 11 into the combustion chamber 13.

Mounted within the open end 11a of the fuel tank is an annular manifold or hollow pipe member 21. A plurality of tubular members such as members 22, 23 and 24 are connected to and in open communication with the interior of the annular manifold and are positioned to extend in generally parallel relationship to each other across the outlet of the fuel tank. Tubular members 22, 23 and 24 may either be formed integrally with the manifold member 21 or may be screw-threadedly mounted in the manifold. It will, of course, be understood that three such members are shown only by way of example and that any convenient number of tubular members may be used, depending upon the desired size of the rocket. It will further be understood that although the tubular members 22, 23 and 24 are shown as being disposed in a horizontal plane transversely across the fuel tank outlet, these members could also be disposed vertically or at any desired angle. In any arrangement, however, it is desirable that the tubular members be parallel with each other in order to define a plurality of fuel outlet openings to produce the fuel plugs or wedges such as the wedges 25, 26, 27 and 28 between the tubular members as the fuel is extruded from the tank into the combustion chamber. That is to say, the tubular members act as fuel dividers in order to separate the incoming fuel to afford a greater burning surface area than would be afforded by the cross-sectional area of the fuel tank outlet.

The annular manifold 21 is provided on its inner side with an annularly extending slot 21a, the center of which lies slightly in back of the central transverse plane through the manifold. As shown in the drawing, the slots 21a open inwardly toward the center of the openings defined by the annular manifold 21. Similarly, each of the tubular members 22, 23 and 24 are provided on each side with slots 22a, 22b, 23a, 23b, 24a, and 24b respectively. The side slots above enumerated are also positioned to have the center of their opening lie in a plane which, like that of the slot 21a, is slightly in back of the central transverse plane through the assembly of the manifold 21 and the tubular members 22, 23 and 24. It will be noted that the slots 21a and 22a, 22b and 23a, 23b and 24a, and 24b and 21a respectively are arranged in opposed pairs pointing generally toward each other and slightly in a rearward direction into the combustion chamber 13.

The manifold 21 is connected through a conduit or pipe line 28 having a valve 29 interposed therein to a tank 30 which is adapted to contain a gas under pressure. The gas in tank 30 may, for example, suitably be air or carbon dioxide.

In operation, the rocket engine is started by opening valve 20 to admit inert gas in back of plunger 17 and thereby begin the extrusion of fuel 12 from tank 11 through the fuel dividing assembly mounted on manifold 21 and thence in the form of plugs or wedges of fuel into the combustion chamber 13 where the fuel is initially ignited by igniter 15. If it is desired to stop the operation of such a rocket engine, the valve 20 could be closed thereby stopping the extrusion of fuel. Although this procedure would itself terminate the burning of the fuel by virtue of the fact that the combustion of this type of fuel depends upon the existence of a minimum back pressure in the combustion chamber which pressure is reduced below this minimum when the extrusion of fuel is stopped thereby permitting the wedges 25, 26, 27 and 28 to burn away and leaving only the reduced burning area afforded by the transverse cross-sectional area through the manifold openings. In many applications, however, it is desired to afford a faster and more positive means of stopping the burning of the fuel.

In the present rocket engine, this fast and positive cut-off of rocket engine thrust is achieved by opening the valve 29 either independently of or simultaneously with the closing of valve 20. When valve 29 is opened, gas under pressure is admitted to manifold 21 and to the tubular members 22, 23 and 24 and then escapes through the above-described side slots in these members. The escaping jets of pressurized gas act to cut off the fuel wedges 25, 26, 27 and 28 and blow them back into the combustion chamber and/or out through nozzle 14 thereby cutting off the burning portion of the fuel and stopping combustion. Even if all of the burning fuel is not removed by this cutting off process, it is apparent that the possible burning area is immediately reduced to the area afforded by the transverse cross-sectional area of the fuel outlets in the manifold fuel splitting arrangement. As noted above, this burning area is insufficient to produce the necessary pressure in chamber 13 to support any possible combustion which might tend to continue.

It is also preferred to maintain the gas in tank 30 under a pressure which is greater than the pressure exerted on plunger 17 by the inert gas from tank 16 so that the component of the gas jets from the above enumerated slots which is directed inwardly into the fuel tank 11 will positively prevent the continued extrusion of fuel 12 even though the valve 20 may have been intentionally or inadvertently left open either due to operating requirements or to failure of operating equipment.

Of course, if it is desired to restart the rocket engine, the valve 29 is closed thereby shutting off the jet blasts through the tubular members. When valve 20 is again opened, the extrusion of fuel again begins, which fuel may again be ignited by the igniter 15 to start the normal operation of the engine. It will be understood that valves 20 and 29, as well as igniter 15, are shown by way of example as manually operated valves. In practice, these components may be manually operated or they may be controlled in any convenient known mechanical or electrical manner to control the operation of the engine in any desired manner.

The term "fuel" as used herein refers to propellents which can be divided into separated flows and burned in a combustion chamber.

While a particular exemplary preferred embodiment of the invention has been described in detail above, it will be understood that modifications and variations therein may be effected without departing from the true spirit and scope of the novel concepts of the present invention as defined by the following claims.

I claim as my invention:

1. In combination with means defining a combustion chamber, means for flowing fuel into said combustion chamber, and dividing means for partitioning said flow into a plurality of separated flows for burning in said combustion chamber, the improvement of gas outlet means associated with said divider means for ejecting jets of pressurized gas to cut off the divided flows and stop combustion in the combustion chamber.

2. In a gelatinous mono-propellant fueled rocket engine of the type having a combustion chamber and nozzle assembly, a fuel tank adapted to contain a body of said fuel, means to extrude said fuel from an open end of said tank into said combustion chamber, and means to ignite said fuel in said combustion chamber, the improvement comprising, means to divide said extruded fuel into a plurality of separate plugs as it is extruded into said combustion chamber, and gas outlet means formed by said dividing means for applying a plurality of jets of pressurized gas to cut said plugs off from said body of fuel to stop said engine.

3. In a rocket engine of the type having a combustion chamber and nozzle assembly, a fuel tank, means to feed fuel through an open end of said tank into said combustion chamber, and means to ignite said fuel in said combustion chamber, the improvement comprising, a plurality of tubular members mounted in said open end of said tank and positioned to define a plurality of separate fuel outlet paths to divide said fuel into a plurality of separate wedges when said fuel is forced into said combustion chamber, each of said tubular members having a pair of slots on opposite sides respectively thereof, said slots facing generally in a direction transverse to said fuel outlet paths, a source of pressurized gas, and means to release said gas through said slots to cut off said wedges to stop the operation of said engine.

4. In a gelatinous mono-propellant engine of the type having a combustion chamber and nozzle assembly, a fuel tank adapted to contain said fuel, means to extrude said fuel through an open end of said fuel tank into said combustion chamber, and means to ignite said fuel in said combustion chamber, the improvement comprising, an annular manifold positioned around the periphery of said open end of said fuel tank, a plurality of tubular members connected to said manifold and positioned in parallel relationship to each other to define a plurality of separate fuel outlet paths to divide said fuel into a plurality of separate wedges when said fuel is extruded into said combustion chamber, each of said tubular members having a pair of slots on opposite sides thereof respectively, an annular slot extending around the inner periphery of said manifold, all of said slots opening generally into the central transverse plane defined by said manifold, a source of pressurized gas, and means to release said gas through said slots to cut off said wedges to quickly stop the operation of said engine.

5. Apparatus as in claim 4 wherein said gas is carbon dioxide.

6. In a rocket engine of the type having a combustion chamber and nozzle assembly, a fuel tank adapted to contain a body of fuel, means to force said fuel from an open end of said tank into said combustion chamber, and means to ignite said fuel in said combustion chamber to start said engine, the improvement comprising, a plurality of hollow fuel divider members positioned in said open end of said fuel tank at the inlet to said combustion chamber to receive fuel therebetween, each of said hollow members having at least one opening therein, and means to release a pressurized gas through said openings to cut off fuel between the divider members.

References Cited in the file of this patent

UNITED STATES PATENTS

| | | |
|---|---|---|
| 515,500 | Nobel | Feb. 27, 1894 |
| 2,213,121 | Davy | Aug. 27, 1940 |
| 2,667,839 | De Carlo | Feb. 2, 1954 |
| 2,761,282 | Allen | Sept. 4, 1956 |

FOREIGN PATENTS

| | | |
|---|---|---|
| 582,621 | Great Britain | Nov. 22, 1946 |
| 723,040 | Great Britain | Feb. 2, 1955 |